United States Patent [19]
Lindroth et al.

[11] Patent Number: 5,887,245
[45] Date of Patent: Mar. 23, 1999

[54] METHOD AND APPARATUS FOR REGULATING TRANSMISSION POWER

[75] Inventors: Magnus Lars Lindroth, Täby; Georg Chambert, Upsala; Roland Stig Bodin, Spånga, all of Sweden

[73] Assignee: Telefonaktiebolaget LM Ericsson, Stockholm, Sweden

[21] Appl. No.: 664,798

[22] Filed: Jun. 17, 1996

Related U.S. Application Data

[63] Continuation of Ser. No. 409,632, Mar. 23, 1995, abandoned, which is a continuation of Ser. No. 941,307, Sep. 4, 1992, abandoned.

[51] Int. Cl.$^6$ .............................. H04B 7/005; H04B 7/26
[52] U.S. Cl. .......................... 455/69; 455/67.6; 455/522
[58] Field of Search ................... 455/33.1–33.4, 455/10, 50.1, 52.1, 54.1, 62, 67.1, 68–70, 73, 88, 115, 127, 226.1, 226.2, 67.6, 522, 575; 379/59, 60, 63

[56] References Cited

U.S. PATENT DOCUMENTS

| | | |
|---|---|---|
| 3,487,169 | 12/1969 | Miyagi . |
| 4,055,733 | 10/1977 | Hoisinger et al. . |
| 4,367,557 | 1/1983 | Stern et al. . |
| 4,479,215 | 10/1984 | Baker . |
| 4,485,486 | 11/1984 | Webb et al. . |
| 4,495,648 | 1/1985 | Giger ........................................ 455/69 |
| 4,509,199 | 4/1985 | Ichihara . |
| 4,577,315 | 3/1986 | Otsuka . |
| 4,670,906 | 6/1987 | Thro ...................................... 455/56.1 |
| 4,677,687 | 6/1987 | Matsuo . |
| 4,696,027 | 9/1987 | Bonta . |
| 4,704,734 | 11/1987 | Menich et al. . |
| 4,777,653 | 10/1988 | Bonnerot et al. .......................... 455/69 |
| 4,811,421 | 3/1989 | Havel et al. . |
| 4,868,795 | 9/1989 | McDavid et al. ........................... 455/69 |
| 4,870,698 | 9/1989 | Katsuyama et al. . |
| 4,910,791 | 3/1990 | Dickinson et al. . |
| 4,996,715 | 2/1991 | Marui et al. . |
| 5,056,109 | 10/1991 | Gilhousen et al. ........................ 455/69 |
| 5,128,965 | 7/1992 | Henriksson .............................. 455/69 |
| 5,129,098 | 7/1992 | McGirr et al. .......................... 455/127 |
| 5,204,970 | 4/1993 | Stengel et al. ............................ 455/69 |
| 5,241,690 | 8/1993 | Larsson et al. ........................... 455/69 |
| 5,257,408 | 10/1993 | Olson et al. ........................... 455/54.1 |
| 5,278,992 | 1/1994 | Su et al. .................................. 455/69 |

FOREIGN PATENT DOCUMENTS

| | | |
|---|---|---|
| 548 939 | 6/1993 | European Pat. Off. . |
| 2229609 | 9/1990 | United Kingdom .................. 455/127 |
| WO 86/00486 | 1/1986 | WIPO . |

OTHER PUBLICATIONS

Examensarbete by Karl Frosselius, Jun. 1, 1987.
Effektreglering I Cellulära Mobiltelefonisystem by Håkan Axén, Jun. 18, 1990.

*Primary Examiner*—Nguyen Vo
*Attorney, Agent, or Firm*—Burns, Doane, Swecker & Mathis, L.L.P.

[57] ABSTRACT

In a telecommunications system, a method and system for power regulation compares the received power to a target value at a receiving station to adjust the power of the transmitting station periodically or non-periodically. Calculation of the signal strength required at the transmitting station may be performed at either the transmitting or receiving station using the path loss between the respective stations. The target value may be a constant or a function of the distance from the base station or a function of the path loss between the transmitting and receiving station.

14 Claims, 5 Drawing Sheets

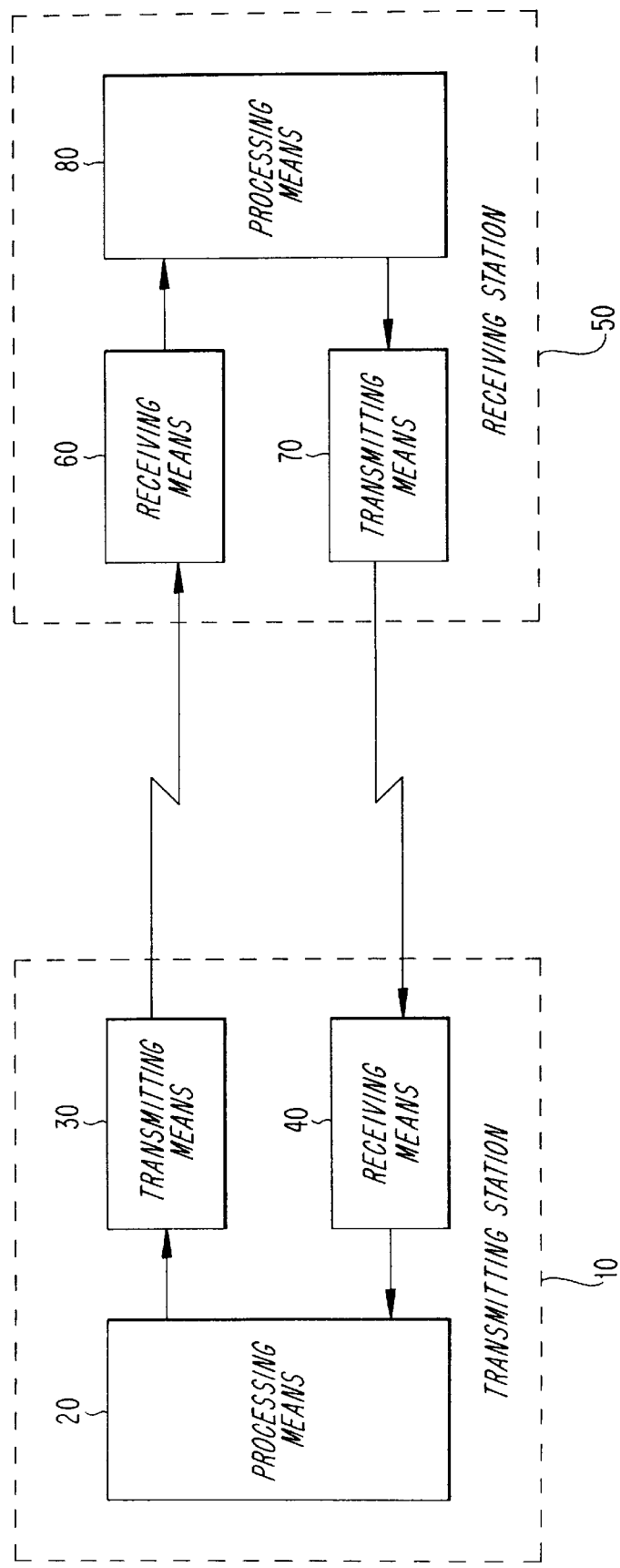

METHOD AND APPARATUS FOR REGULATING TRANSMISSION POWER

This application is a continuation of application Ser. No. 08/409,632, filed Mar. 23, 1995, now abandoned, which is a continuation of application Ser. No. 07/941,307, filed Sep. 4, 1992, now abandoned.

FIELD OF THE INVENTION

The present invention relates to the use of power regulation techniques in mobile radio telephone communications, and more particularly to periodic and non-periodic power regulation of signal strengths received at a receiving station.

BACKGROUND

To minimize interference between different transmitters in a mobile radio telephone system, the transmission power of the mobile station, and in some systems the transmission power of the base station, is regulated at intervals. In power regulation, the goal is to ensure that only the power absolutely necessary to maintain satisfactory transmission of a call between a mobile station and a base station is used. By regulating the power of mobile transmissions to low levels with sufficient transmission quality, the likelihood of interference between mobile transmissions is reduced.

Another reason to maintain the power of mobile transmissions at the lowest possible level is to reduce the energy consumed at the mobile station. Accordingly, the batteries used to power portable mobile stations will require a smaller capacity. A corresponding reduction in the size of the battery needed results whereby the portable mobile stations can be made smaller.

In existing analog cellular systems, the sending power of a mobile is regulated by an order from the base station only when absolutely necessary. The ongoing conversation is disturbed when a power regulation order is sent resulting in traffic channel muting. Therefore, power regulation only occurs when the level of the signal received in the base station is outside a range defined by an upper and a lower threshold.

In such prior art systems, for example as shown in U.S. Pat. No. 4,485,486 to Webb et al, power regulation is achieved by measuring the received signal strength of transmissions from a mobile station at the corresponding base station, comparing the signal strength with an upper and a lower threshold indicative of a desired signal strength level range for proper reception, and issuing a power adjustment order from the base to the mobile if indicated by the comparison result. The monitoring is carried out at relatively infrequent intervals, typically on the order of once every five seconds, and the regulation is carried out only if indicated as being necessary.

Although modern digital systems are adequate for power regulation, system performance can be improved further. While the amount of interference is reduced over regulated analog systems, interference still presents a problem.

The present invention provides power regulation for up-link and/or down-link transmissions which maintain received signal strength values closer to the intended ideal value than achieved in known systems. Further, the present invention is adapted to modern cellular systems, in particular digital systems, where orders are transmitted on channels separated from speech. Consequently, the need to mute speech during power order transmission may be eliminated, and more frequent adjustment of power levels may be implemented.

SUMMARY

According to the present invention, power is regulated under system standards (e.g., GSM specification) by calculating an optimal correction value, thus maintaining a received signal level as close as possible to the intended ideal value. Power regulation orders are made periodically, e.g., two times per second, rather than only when the received signal falls outside a range defined by two thresholds. In the present invention, if no correction is required at a certain point in time, an order may be given to transmit at the same specified level or the order may be suppressed.

To provide optimal correction values, the new sending level can be calculated by adding the path loss between sender and receiver to the predetermined receiving level. The path loss may be calculated by taking the old sending level less the old received level. The path loss calculation results in improved stability with only minor oscillations around the predetermined value. Typically, calculations are made in dB levels, thus the step of adding or a difference can refer to dB levels.

In a mobile radio communications system according to the present invention, a method is provided for regulating the transmission of power between a mobile station and a base station includes the steps of measuring a received power level from a transmitting station, calculating a new transmission power level using a predetermined received power level, a known transmission power level and the measured received power level and ordering the transmitting station to transmit at the new transmission power level. In one embodiment the step of calculating further includes the steps of determining a path loss between the base station and the mobile station, the path loss corresponding to a difference between the known transmission power level and the measured received power level and combining the path loss with the predetermined received power level to determine the new transmission power level. The path loss may be determined at the transmitting station or at the receiving station.

The predetermined received power level may be defined as any function or may be a constant. For example in one embodiment, it is a function of the path loss between the transmitting station and the receiving station. According to another embodiment, the predetermined power level is a function of the distance between the transmitting station and the receiving station. The distance may be determined, e.g., by measuring the round trip delay of associated down-link/up-link TDMA (time division multiple access) time slots.

In another embodiment of the present invention, the step of measuring further includes sampling the received power level values from the transmitting station at regular intervals during a measurement period, filtering the sampled power level values, and calculating an average received power level for the measurement period.

In yet another embodiment, a method for regulating transmission power between a mobile station and a base station includes measuring the quality of a signal from a transmitting station and ordering the transmitting station to transmit at a new transmission power level based on the signal quality. The step of measuring may include assessing the bit error rate, bit error content, or speech quality (carrier to interference ratio C/I). Further, the transmitting station may be ordered to transmit at a new lower transmission power level only when the signal quality exceeds a threshold.

BRIEF DESCRIPTION OF THE DRAWINGS

The present invention will now be described in more detail with reference to preferred embodiments of the present invention, given only by way of example, and illustrated in the accompanying drawings, in which:

FIG. 3 is an exemplary system for performing power regulation;

DETAILED DESCRIPTION

While the following description is in the context of cellular communication systems involving portable or mobile radio telephones and/or personal communication networks, it will be understood by those skilled in the art that the present invention may be applied to other wireless communication applications.

Figure 1:
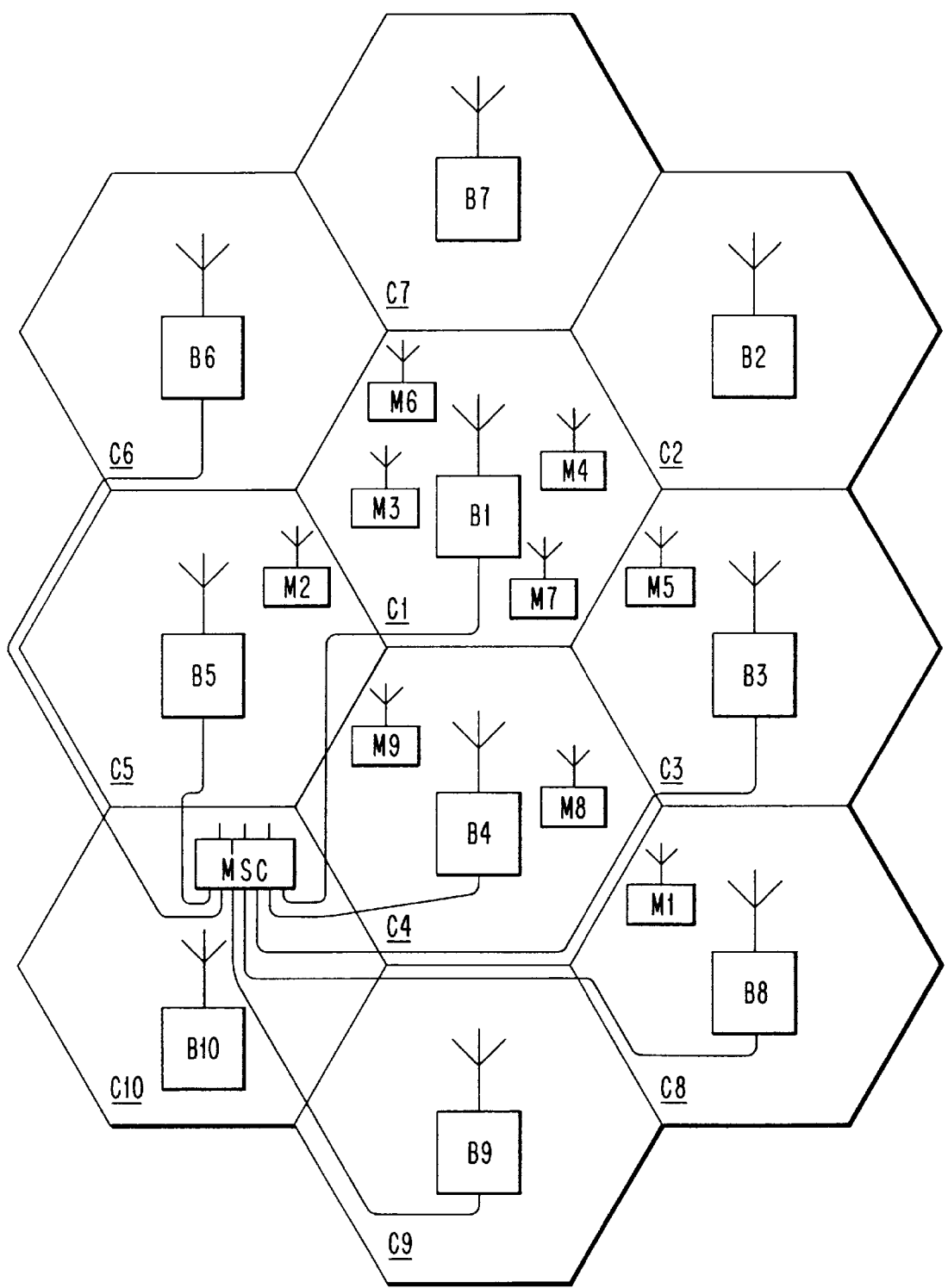
FIG. 1 is a schematic diagram illustrating an example of a cellular mobile radio system, illustrating the relationship of various elements of the system including cells, a mobile switching center, base stations and mobile stations.

FIG. 1 is a schematic diagram illustrating ten cells, C1 to C10, in a cellular mobile radio telephone system. Normally the method according to the present invention would be implemented in a cellular mobile radio system comprising many more cells than ten. For purposes of this description, the system depicted herein is considered to be an isolated portion of a larger system which has been fragmented.

For each cell C1 to C10, there is a respective base station B1 to B10. FIG. 1 illustrates base stations situated in the vicinity of the respective cell centers and having omni-directional antennas. The base stations of adjacent cells may however be arranged proximate to cell borders and have directional antennas.

FIG. 1 also illustrates nine mobile stations M1 to M9, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center (MSC). The MSC is connected to all ten illustrated base stations by cables. The mobile switching center is hardwired to a fixed public switching telephone network (PSTN) or similar fixed network. All cables from the MSC to base stations and cables to the fixed network are not illustrated. Further, other media may be used instead of cables for base to MSC communications, e.g., fixed radio links and fiber optic links.

The cellular mobile radio system illustrated in FIG. 1 includes a plurality of radio channels for communication. The system may be designed for analog information, e.g., speech; digitized analog information, e.g., digitized speech; pure digital information, e.g., pure digital data; and coded information, e.g., coded digital data.

The power necessary for a mobile station to efficiently transmit to a base station with minimal interference can be determined by the land system hardwired to the base or just the base using the path loss between the mobile and the base. Each time a power order is sent from the base, a new transmission power level is calculated and sent to the mobile. The calculated transmission power level does not necessarily differ from the previous transmission power level, but it depends on the previous transmission power level. The path loss between the mobile and the base is the old transmission power level in the mobile station ($MSPWR_{old}$) less the measured received signal strength ($SS_{filt}$) in the base station. $SS_{filt}$ is not an instantaneous value, but represents the measured signal strength over a certain time period. To determine a new mobile station transmission power level ($MSPWR_{new}$), a desired received signal strength ($SS_{des}$) is added to the path loss. Mathematically, the new mobile station transmission power level is represented as:

$$MSPWR_{new} = SS_{des} + (MSPWR_{old} - SS_{filt})$$

Alternatively, the path loss may be calculated using measurements in the mobile station reported to the land system and the power level of the signal sent by the base station to the mobile station. The desired received signal strength may be set to achieve a constant value or vary according to a function in different embodiments of the present invention. For example, in one embodiment the desired received signal is a function of the distance between the mobile station and the base station. In another embodiment, the desired signal strength value is a function of the path loss between the base station and the mobile station. Exemplary mobile station power regulation is described in copending U.S. patent application Ser. No. 712,930 filed Jun. 7, 1991, entitled "Method For Regulating Power In A Digital Mobile Telephony System", which is incorporated herein by reference.

Figure 2:
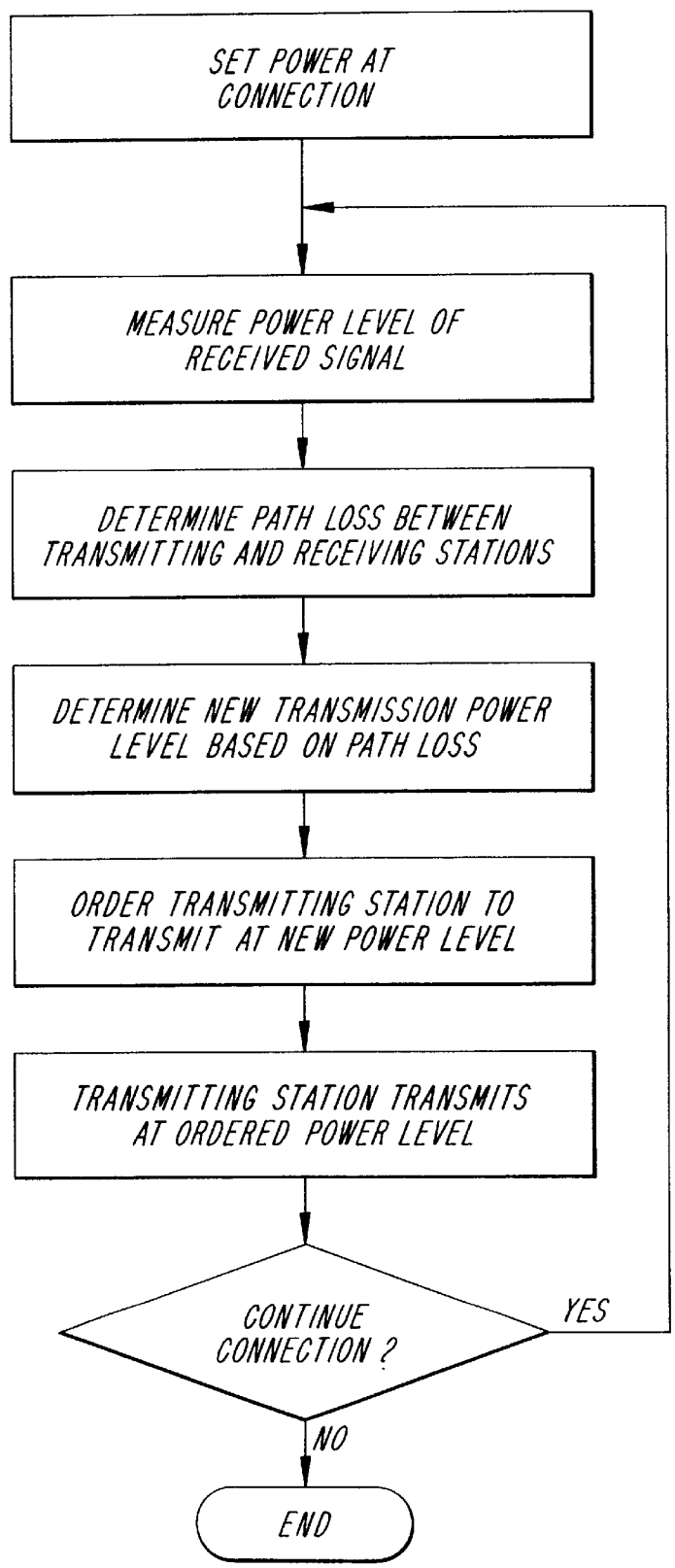
FIG. 2 is a flow diagram of an exemplary power regulating method according to the present invention.

A flow chart is shown in FIG. 2 which represents the steps necessary to carry out an exemplary power regulation method of the present invention. FIG. 3 represents the pertinent elements of an exemplary system including a transmitting (base or mobile) station and a receiving (mobile or base) station for performing power regulation. In U.S. patent application Ser. No. 712,930, the particular elements of a mobile station and a base station are shown in FIGS. 2 and 3 of that application and described therein.

The operation of the exemplary system of the present invention will be described with reference to FIG. 3. The transmitting station 10 transmitting means 30 sends radio signals to the receiving station 50. The receiving means 60 receives the radio frequency signals and measures the signal level and the signal transmission quality of the received signals. Each of these magnitudes is measured by the receiving means 60 at the receiving station 50, which in exemplary embodiments can be a base station or a mobile station. The signal level and signal transmission quality are sent to the processing means 80. The processing means 80 performs the necessary transmission power regulation. A new transmission power level is calculated by the processing means 80. Subsequently, the transmitting means 70 orders the transmitting station 10 to transmit at the new transmission power level. The order is received by the receiving means 40 which sends the order to processing means 30 which in turn orders the transmitting means 30 to transmit at the new transmission power level.

The signal strength values ($SS_{meas}$) received during a number of the latest measurement periods are input to a finite impulse response (FIR) filter. The filtered signal strength $SS_{filt}$ is represented by the relation:

$$SS_{filt} = MSPWR_{old} + 1/c * \sum_{i} (w_i *(SS_i - MSPWR_i))$$

where c is the sum of all weights $w_i$ and i is a respective time index indicating a particular measurement period in the filtering duration where $SS_i$ is $SS_{meas}$ for the particular measurement period and $MSPWR_i$ is an associated transmission power. Note that $SS_{meas}$ is based on a single measurement period while $SS_{filt}$ is based on a number of measurement periods, the number being determined by the filter length. The actual filtering is done in path loss where the difference between received signal strength and transmission power level is filtered. The result is then "transformed" back to signal strength by adding the $MSPWR_{old}$. This method of filtering ensures stability of the control algorithm.

A new mobile station transmission power level $MSPWR_{new}$ is calculated using the aforesaid mathematical relation. Subsequently, the new transmission power level order is sent to the mobile station. In this embodiment, power level setting orders are transmitted to the mobile at regular intervals irrespective of the magnitude of the power level change or possibly even whether a change in power is necessary.

Power regulation may be divided into two phases, initial power regulation and stationary power regulation. Stationary regulation may not be started until the filter is filled to a specified length. In an exemplary embodiment only down regulation is performed until the power level is equal to or below a predefined desired initial regulation target level. When this condition is satisfied or if the signal strength filter is filled, initial regulation is concluded and stationary regulation commences. Stationary regulation has been previously described in the aforesaid description.

The power range of the mobile station can be limited by the base station. The following relationship can be used to set the limits of the power:

MS_PWR_MAX≧MS_PWR≧(MS_PWR_MAX-PWR_DYN_RANGE)

The maximum power capability of the mobile station is represented by MS_PWR_MAX. PWR_DYN_RANGE, dynamic power range, is a parameter defined by the mobile station operator where:
PWR_DYN_RANGE≦(MS_PWR_MAX-MS_PWR_MIN)

with MS_PWR_MIN representing the minimum power capability of the mobile station. When the received signal strength exceeds a value SS_MAX, the mobile station is allowed to transmit at a power level lower than MS_PWR_MAX-PWR_DYN_RANGE. Accordingly, the desired signal strength, $SS_{des}$, is set to SS_MAX and the power regulation can be performed without applying the power range limitation.

The quality of signal transmission affects how the power is regulated. In a mobile radio system following the GSM specification or the EIA/TIA IS-54 specification, the signal quality can be measured by assessing the bit error rate/error content of the digital symbols, i.e., the number of bits in error in relation to the total number of bits, using a host of methods known in the art, for example the method described in a GSM document entitled GSM/WP2 Doc. 17/88.

There is an accepted range of quality which must be maintained. In GSM systems, the relation between quality levels and bit error rate is shown in Table 1.

TABLE 1

| BIT ERROR RATE | QUALITY LEVEL |
|---|---|
| <0.2% | 0 |
| 0.2%–0.4% | 1 |
| 0.4%–0.8% | 2 |
| 0.8%–1.6% | 3 |
| 1.6%–3.2% | 4 |
| 3.2%–6.4% | 5 |
| 6.4%–12.8% | 6 |
| >12.8% | 7 |

The relation between quality level and experienced speech quality varies according to who is making the quality determination. An example of this relation is depicted in Table 2.

TABLE 2

| QUALITY LEVEL | SPEECH QUALITY |
|---|---|
| 0–3 | GOOD |
| 4 | FAIR |
| 5 | POOR |
| 6–7 | VERY POOR |

In one embodiment, the possible quality value range is divided into three subranges. The maximum step size which the power can be lowered at any given time depends on which range the quality value falls within. The allowed down regulation size is set by the averaged quality level. A quality in a certain quality range provides a regulation size limit. For example, if the quality of the received signal is poor, the maximum down regulation step size is set to zero, i.e., only increased power level orders are permitted if the quality is poor. Likewise, if the quality of the signal transmission is good, a maximum reduction in power regulation is possible which is based on a power setting obtainable by the mobile station during the next regulation interval. An example of a system with three subranges for down regulating due to bad quality is represented in Table 3. Of course, other systems will employ different ranges for quality.

TABLE 3

| Quality Range | Maximum Down Regulation |
|---|---|
| 0–1 | 16 dB (i.e. no limitation) |
| 2–3 | 2 dB (moderate steps only) |
| 4–7 | 0 dB (no down regulation) |

In the system of the present invention, power regulation orders are transmitted on channels separate from the speech channels, thus eliminating the need to mute speech during regulation order transmission. There is an associated control channel for each traffic channel referred to as the slow associated control channel (SACCH). The SACCH is a continuous signalling channel in parallel with the speech path used for transmission of control and supervisory messages between the base and mobile stations. Power regulation orders can be transmitted from base to mobile over the SACCH.

Figure 4A:
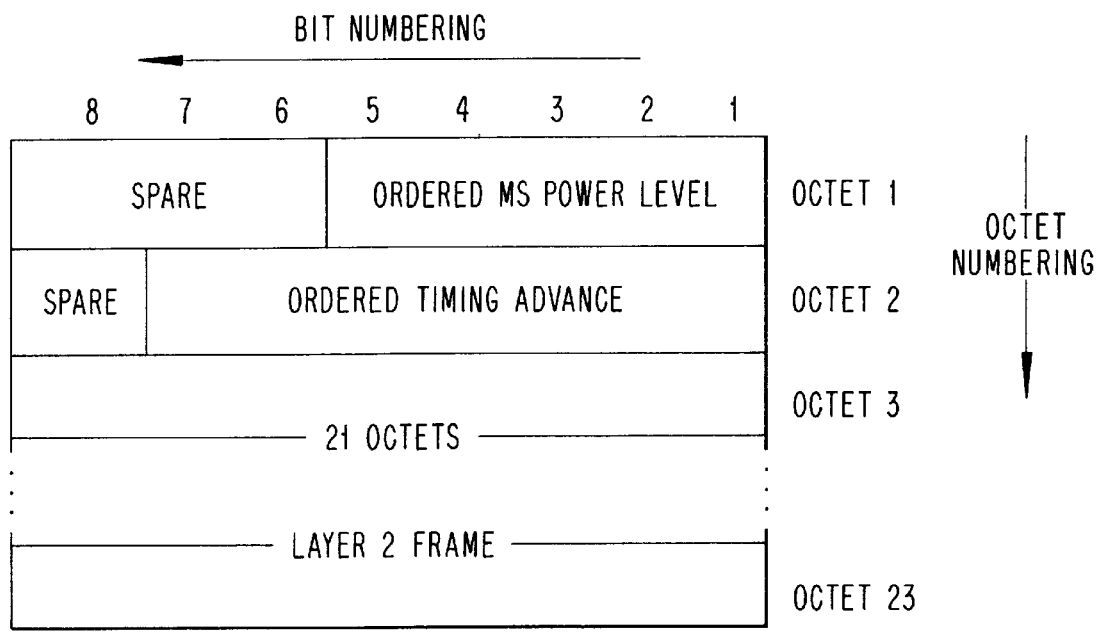
FIG. 4a is an exemplary block format for a down-link transmission.
Figure 4B:
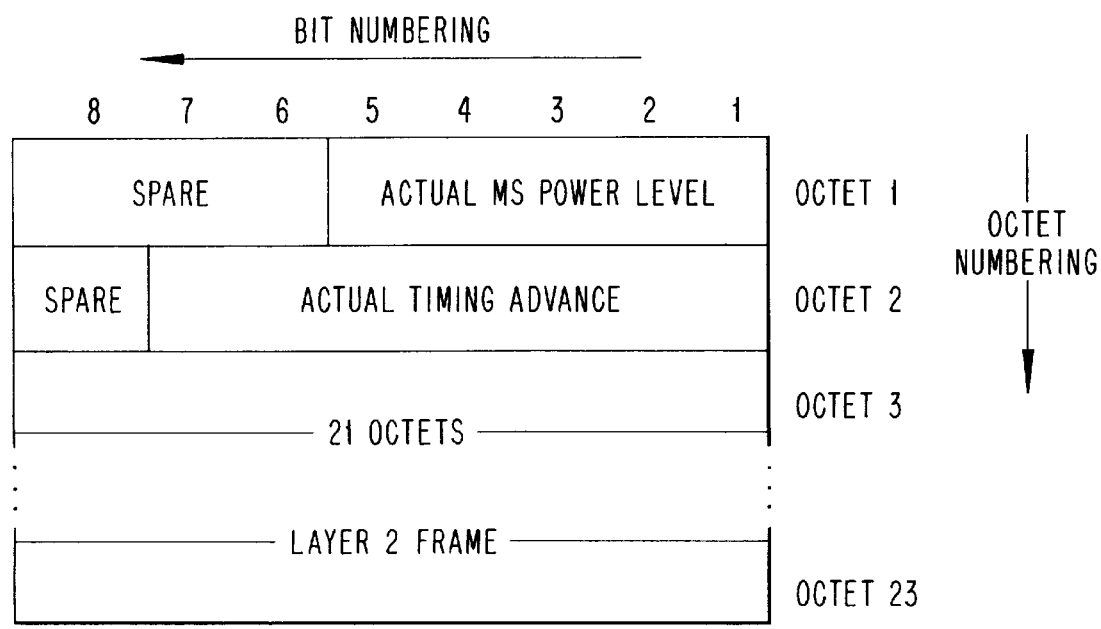
FIG. 4b is an exemplary block format for an up-link transmission.
Figure 5:
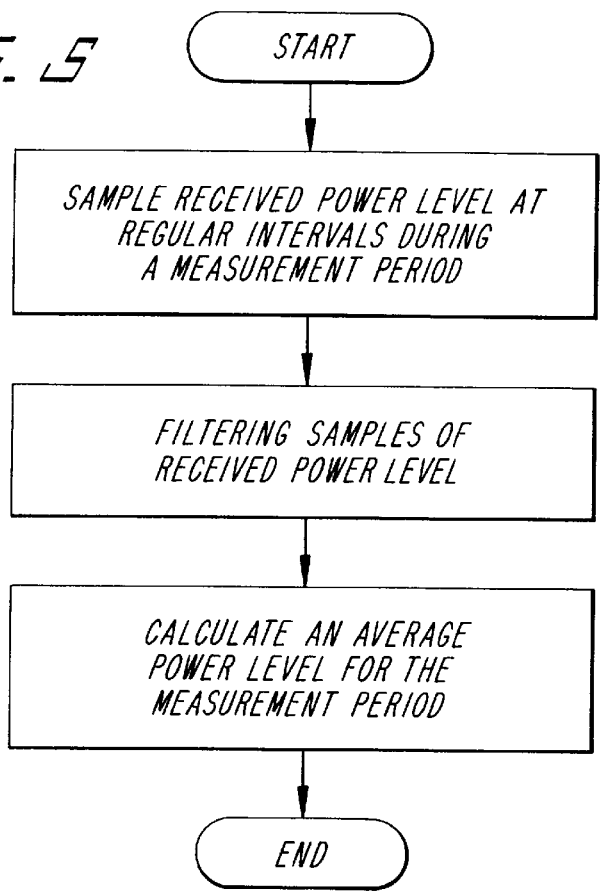
FIG. 5 is a flow diagram of a subroutine of the power regulating method illustrated FIG. 2.
Figure 6:
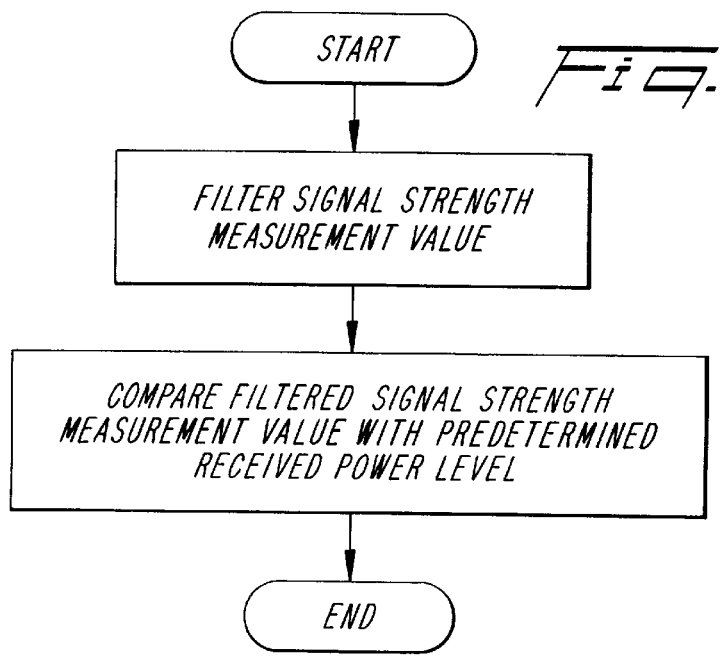

FIGS. 4a and 4b represent exemplary SACCH message formats for a GSM system where the mobile station power is being regulated by the base station. FIG. 4a represents the down-link block format and FIG. 4b the up-link block format. In this situation, the power order is transmitted on the down-link SACCH (land to mobile) and power acknowledgements are transmitted on the up-link (mobile to land).

When the base station power level is regulated (by the base station), it is not necessary to send power orders and acknowledgements on the SACCH. Instead, the information necessary for regulation of the base is available internally in the base. The mobile, however, must send the measured signal strength $SS_{meas}$ on the SACCH to the base station. The message structure for this information in a GSM system can be found in GSM 04.08. The primary difference between mobile station and base station power regulation is whether the power ordering station is on the same side of the radio link as the station (base or mobile) whose power is regulated.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a time division multiple access mobile radio communication system operating on a plurality of radio channels, each radio channel being defined by a radio frequency and a time slot in a frame of time slots, a method for regulating transmission power between a mobile station and a base station comprising the steps of:

measuring at a receiving station on a particular one of said radio channels a received power level from a transmitting station;

calculating at said receiving station a new transmission power level for said particular radio channel using a predetermined received power level, a known transmission power level of said channel, and said measured received power level by determining a path loss between said transmitting station and said receiving station, said path loss equal to a difference between said known transmission power level and said measured received power level, wherein said new transmission power is equal to the sum of the predetermined received power level and the path loss; and ordering said transmitting station to transmit at said new transmission power level, wherein said new transmission power level is higher, lower, or equal to said known transmission power level.

2. The method according to claim 1, wherein said receiving station is said mobile station and said transmitting station is said base station.

3. The method according to claim 1, wherein said receiving station is said base station and said transmitting station is said mobile station.

4. The method according to claim 1, wherein said predetermined received power level is a function of a distance between said transmitting station and said receiving station.

5. The method according to claim 1 wherein said step of measuring further includes the steps of:

sampling said received power level at regular intervals during a measurement period;

filtering samples of said received power level; and calculating an average power level for said measurement period.

6. The method according to claim 1, wherein said predetermined received power level is a function of a path loss between said transmitting station and said receiving station.

7. In a time division multiple access mobile radio communications system operating on a plurality of radio channels, each radio channel being defined by a radio frequency and a time slot in a frame of time slots, a method of periodically regulating transmission power between a mobile station and a base station, said method comprising the steps of:

sampling at regular intervals at a receiving station on a particular one of said radio channels a received power level from a transmitting station;

periodically calculating at said receiving station a new transmission power level for said particular radio channel using a predetermined received power level, a known transmission power level of said channel, and said measured received power level by determining a path loss between said transmitting station and said receiving station, said path loss equal to a difference between said known transmission power level and said measured received power level, wherein said new transmission power is equal to the sum of the predetermined received power level and the path loss; and periodically ordering said transmitting station to transmit at said new transmission power level, wherein said new transmission power level is higher, lower, or equal to said known transmission power level.

8. In a time division multiple access mobile radio communication system operating on a plurality of radio channels, each radio channel being defined by a radio frequency and a time slot in a frame of time slots, a system for regulating transmission power between a mobile station and a base station comprising:

means for measuring on a particular one of said radio channels at a receiving station a received power level from a transmitting station;

means for calculating at the receiving station a new transmission power level for said particular radio channel using a predetermined received power level, a known transmission power level of said channel, and said measured received power level by determining a path loss between said transmitting station and said receiving station, said path loss equal to a difference between said known transmission power level and said measured received power level, wherein said new transmission power is equal to the sum of the predetermined received power level and the path loss;

means at the receiving station for sending an order to said transmitting station to transmit at said new transmission power level, wherein said new transmission power level is higher, lower, or equal to said known transmission power level; and means at said transmitting station for receiving said order and for implementing said order.

9. The system according to claim 8, wherein said receiving station is said mobile station and said transmitting station is said base station.

10. The system according to claim 8, wherein said receiving station is said base station and said transmitting station is said mobile station.

11. The system according to claim 8, wherein said predetermined received power level is a function of a distance between said transmitting station and said receiving station.

12. The system according to claim 8 wherein said measuring means samples said received power level at regular intervals during a measurement period, filters samples of said received power level, and calculates an average power level for said measurement period.

13. The system according to claim 8, wherein said predetermined received power level is a function of a path loss between said transmitting station and said receiving station.

14. In a time division multiple access mobile radio communication system operating on a plurality of radio channels, each radio channel being defined by a radio frequency and a time slot in a frame of time slots, a system for periodically regulating transmission power between a mobile station and a base station comprising:

means for sampling at regular intervals at a receiving station on a particular one of said radio channels a received power level from a transmitting station;

means for periodically calculating at said receiving station a new transmission power level for said particular radio channel using a predetermined received power level, a known transmission power level of said channel, and said measured received power level by determining a path loss between said transmitting station and said receiving station, said path loss equal to a difference between said known transmission power level and said measured power level, wherein said new transmission power is equal to the sum of the predetermined received power level and the path loss; and means for periodically ordering said transmitting station to transmit at said new transmission power level, wherein said new transmission power level is higher, lower, or equal to said known transmission power level.

* * * * *